US010585181B2

United States Patent
Cornic et al.

(10) Patent No.: US 10,585,181 B2
(45) Date of Patent: Mar. 10, 2020

(54) METHOD FOR MEASURING A DIRECTION OF INCIDENCE OF AN INCIDENT WAVE FOR AN INSTANTANEOUS WIDEBAND RECEIVER AND ASSOCIATED RECEIVER

(71) Applicant: THALES, Courbevoie (FR)

(72) Inventors: Pascal Cornic, Brest (FR); Jean Paul Artis, Brest (FR); Christian Renard, Elancourt (FR)

(73) Assignee: THALES, Courbevoie (FR)

( * ) Notice: Subject to any disclaimer, the term of this patent is extended or adjusted under 35 U.S.C. 154(b) by 366 days.

(21) Appl. No.: 15/539,021

(22) PCT Filed: Dec. 22, 2015

(86) PCT No.: PCT/EP2015/081004
§ 371 (c)(1),
(2) Date: Jun. 22, 2017

(87) PCT Pub. No.: WO2016/102583
PCT Pub. Date: Jun. 30, 2016

(65) Prior Publication Data
US 2017/0371031 A1 Dec. 28, 2017

(30) Foreign Application Priority Data
Dec. 22, 2014 (FR) ..................................... 14 02957

(51) Int. Cl.
*G01S 13/44* (2006.01)
*G01S 3/02* (2006.01)
(Continued)

(52) U.S. Cl.
CPC .............. *G01S 13/44* (2013.01); *G01S 3/023* (2013.01); *G01S 3/32* (2013.01); *G01S 7/021* (2013.01); *H01Q 1/36* (2013.01); *H01Q 9/27* (2013.01)

(58) Field of Classification Search
CPC . G01S 13/44; G01S 3/32; G01S 3/023; G01S 7/021; H01Q 9/27; H01Q 1/36
(Continued)

(56) References Cited

U.S. PATENT DOCUMENTS 3,175,217 A 3/1965 Kaiser et al.
3,229,293 A 1/1966 Little et al.
(Continued)

FOREIGN PATENT DOCUMENTS

DE 4421191 A1 12/1995

OTHER PUBLICATIONS

Preliminary Search Report dated Oct. 29, 2015 during the prosecution of Priority Application No. FR 1402957 with corresponding English Search Report issed during the prosecution of PCT/EP2015/081004 dated Mar. 3, 2016.
(Continued)

*Primary Examiner* — Timothy X Pham
(74) *Attorney, Agent, or Firm* — Troutman Sanders LLP

(57) ABSTRACT

This method involves, for an array of at least two antennas pointing in different directions and the respective radiation patterns of which overlap one another, each antenna including at least two radiating elements so as to be able to work in a first operating mode associated with a first radiation pattern ($\Delta$) and according to a second operating mode associated with a second radiation pattern ($\Sigma$): acquiring, for each antenna, a first signal (S$\Delta$i) corresponding to the first operating mode and a second signal (S$\Sigma$i) corresponding to the second operating mode; determining, for each antenna, an opening half-angle ($\rho$i) of a cone of possible directions of incidence from the amplitude of the first and second signals; calculating the bearing angle ($\Theta 0$) and/or the elevation angle ($\varphi 0$) of the direction of incidence by intersection of the cones of possible directions of incidence determined for each antenna.

13 Claims, 3 Drawing Sheets

(51) Int. Cl.
  *G01S 3/32* (2006.01)
  *G01S 7/02* (2006.01)
  *H01Q 9/27* (2006.01)
  *H01Q 1/36* (2006.01)

(58) Field of Classification Search
  USPC .......................................................... 342/149
  See application file for complete search history.

(56) References Cited

U.S. PATENT DOCUMENTS

| | | | |
|---|---|---|---|
| 4,366,483 | A | 12/1982 | Hagedon et al. |
| 5,065,162 | A | 11/1991 | Akaba et al. |
| 5,526,001 | A | 6/1996 | Rose et al. |
| 2016/0111791 | A1* | 4/2016 | Asakawa ................ H01Q 9/42 |
| | | | 343/700 MS |

OTHER PUBLICATIONS

Kim et al., "Cavity-backed Two-arm Spiral Antenna with a Ring-shaped Absorber for Partial Discharge Diagnosis," Journal of Electrical Engineering & Technology vol. 8. No. 4: pp. 856-862, (Jul. 1, 2013) XP055223960.

Hettak et al., "Practical design of uniplanar broadband subsystems. Application to a wideband hybrid magic tee," Microwave Symposium Digest, May 23, 1994 (May 23, 1994), pp. 915-918 vol. 2. XP032365977.

\* cited by examiner

METHOD FOR MEASURING A DIRECTION OF INCIDENCE OF AN INCIDENT WAVE FOR AN INSTANTANEOUS WIDEBAND RECEIVER AND ASSOCIATED RECEIVER

CROSS-REFERENCE TO RELATED APPLICATIONS

This is a U.S. national phase application under 35 U.S.C. § 371 of international patent Application no. PCT/EP2015/081004, filed on Dec. 22, 2015, and claims benefit of priority to French Patent Application No. 1402957, filed Dec. 22, 2014. The entire contents of these applications are hereby incorporated by reference.

TECHNICAL FIELD

The present invention relates to methods for measuring the direction of incidence of an electromagnetic wave on an instantaneous wideband receiver, used in particular to listen to and provide electromagnetic information.

BACKGROUND

Methods for measuring the direction of incidence of a wave are known. For example, document DE 44 21 191 A1 describes one such method.

As shown in FIG. 1, the receiver generally includes an array of antennas 10, including N antennas, preferably identical to one another. In FIG. 1, N is equal to six.

The antennas are distributed along a plane XY transverse to the axis Z of a support mast, positioned substantially vertically.

In this horizontal plane XY, the antennas are positioned so as to have the pointing directions equally distributed in terms of angle within the angular domain to be covered. For example, they may be positioned over a regular polygon, a hexagon in FIG. 1.

Each antenna has a radiation pattern having a maximum along its pointing axis Ai.

The radiation pattern of an antenna has a large opening at 3 dB, typically about 50° to 120°.

The main lobes of the radiation patterns of the antennas overlap one another such that the array covers 360° in the horizontal plane XY.

Each antenna is capable of covering a very wide frequency band, typically of about ten GHz, situated within a frequency range extending between 10 MHz and 100 GHz, preferably between 100 MHz and 50 GHz.

For an instantaneous wideband receiver, the measurement of the direction of incidence D of the incident wave, i.e., the determination of a bearing angle $\Theta 0$ in the plane XY, is obtained by carrying out an amplitude goniometry method. This method takes advantage of the fact that the characteristics of the antennas are identical, but that only their orientation relative to the incidence direction D of the wave changes. The measurement of the incidence direction D is then obtained for example by interpolation of a normalized radiation pattern characteristic of the type of antenna by the amplitudes of the signals generated by each antenna.

However, the known methods for measuring the direction of incidence of a wave have several drawbacks.

First, the obtained measurement is relatively imprecise. It is typically obtained with a precision of between 3 and 10°.

Lastly, the measurement is limited to only the horizontal plane XY, i.e., the determination of the bearing angle. It is consequently biased by the position of the source of the electromagnetic wave outside the plane XY, i.e., biased by the elevation angle $\Phi 0$ of the direction of incidence.

It should be noted that instantaneous wideband antennas are known, for example from document U.S. Pat. No. 3,229,293 A, including at least four radiating elements each forming a strand, the strands being wound in spirals around a same center in a plane transverse to the pointing axis of the antenna. The antenna then includes four supply points, for which a beam formation of the two-plane monophase type is possible, by phase shifting the different supply points relative to one another, for example by 90°. In this case, a measurement of the incidence direction along two planes, i.e., bearing and elevation, can be obtained. However, this type of antenna uses a complex technology, in particular in very wideband cases, and requires four excitation or reception channels (depending on whether the antenna is used as a transmitter or a receiver).

SUMMARY

The invention therefore aims to resolve this problem, in particular by proposing a method for measuring the incidence direction of a wave that makes it possible to obtain more precise measurements.

The invention relates to a method for measuring an incident direction of a wave for an instantaneous wideband receiver and an instantaneous wideband receiver as defined by the claims.

BRIEF DESCRIPTION OF THE DRAWINGS

The invention and its advantages will be better understood upon reading the following detailed description of one particular embodiment, provided solely as a non-limiting example, this description being done in reference to the appended drawings, in which.

DETAILED DESCRIPTION

Figure 1:
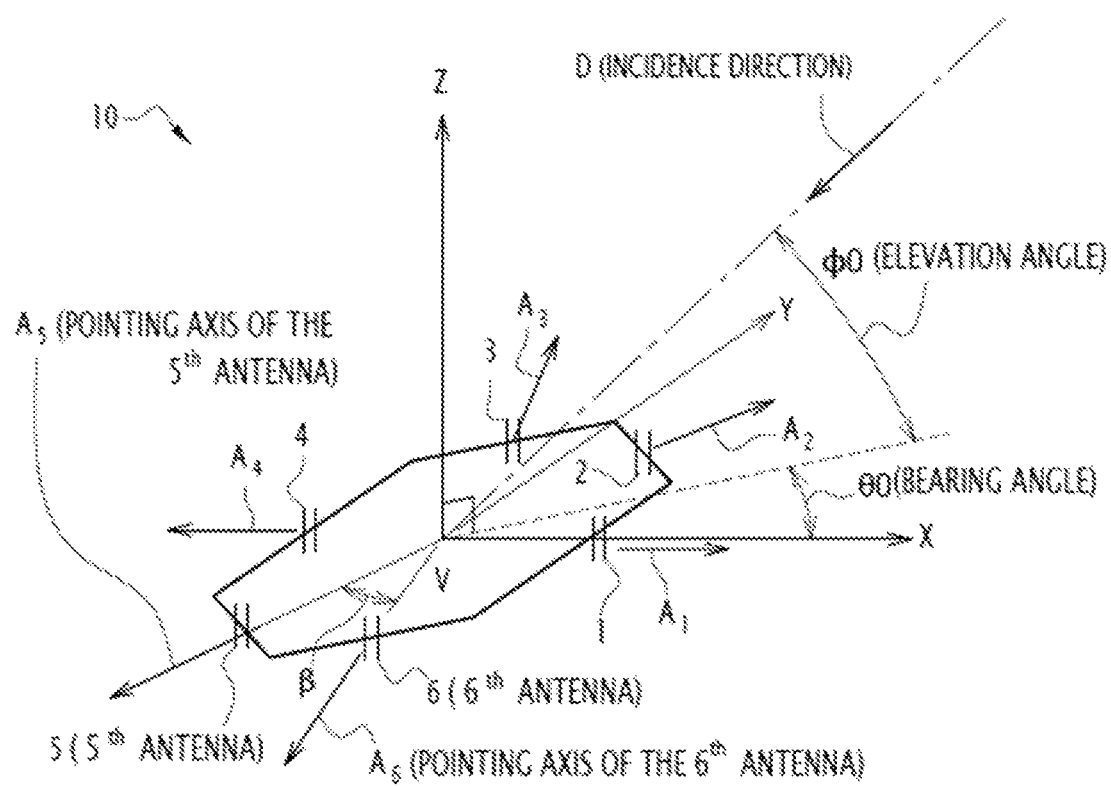
FIG. 1 is a schematic illustration of the antenna array of an instantaneous wideband receiver according to the invention.
Figure 2:
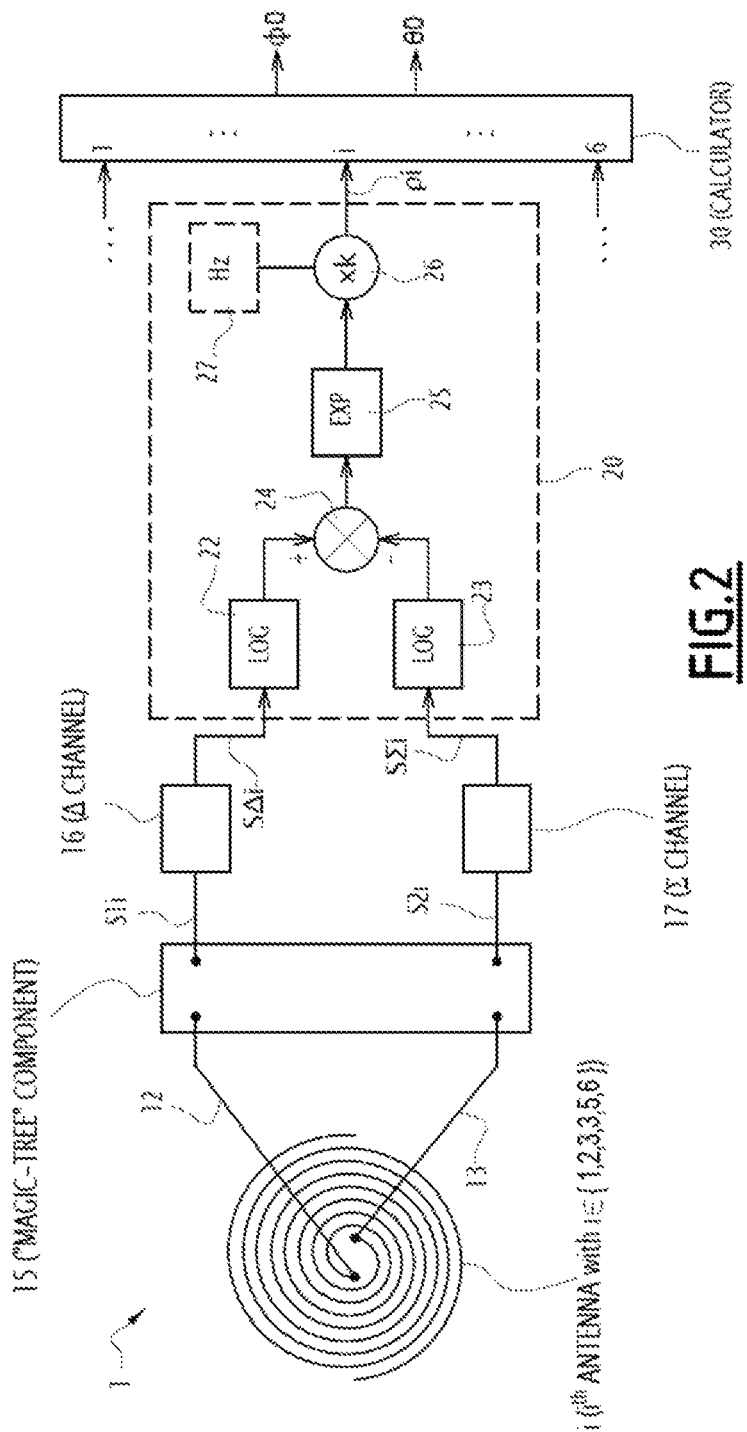
FIG. 2 is a schematic illustration of one preferred embodiment of an antenna of the instantaneous wideband receiver according to the invention and its processing chain.

FIGS. 1 and 2 show one preferred embodiment of the spontaneous wideband receiver making it possible to carry out the method for measuring the direction of incidence (or incidence direction) of an electromagnetic wave. The incidence direction D is characterized by a bearing angle $\Theta 0$ in a horizontal plane XY and an elevation angle $\Phi 0$ in a plane perpendicular to the plane XY.

As shown in FIG. 1, the receiver includes an array 10 made up of six antennas, identified by an index i from 1 to 6.

The antennas i, which are identical to one another, are wideband printed spiral antennas.

Each antenna i is for example according to the antenna described in the article by Han-Byul Kim et al. "Cavity-backed Two-arm Spiral Antenna with a Ring-shaped Absorber for Partial Discharge Diagnosis" in J Electr Eng Technol Vol. 8, No. 4: 856-862, 2013, http://dx.doi.org/10.5370/JEET.2013.8.4.856. This antenna includes at least one pair of radiating elements, which is made up of two strands wound in a spiral in one another, in the plane perpendicular to the pointing axis Ai of the antenna i, around a same center.

The antennas i are positioned in the plane XY such that their pointing axis Ai rests in the plane XY.

In order for the method for measuring the incidence direction of a wave according to the invention to allow a measurement over 360°, the angle β between the pointing axes Ai of two successive antennas i is chosen such that the radiation patterns of these two antennas working in the same mode (as will be described below) overlap over at least half of the opening of an antenna.

Thus, in FIG. 1, the antennas have an opening of 120° and the antennas are uniformly angularly distributed, the angle β between the pointing axes Ai of two successive antennas i being 60°. In FIG. 1, for clarity reasons, the angle β is only shown between the axis $A_5$ of antenna 5 and the axis $A_6$ of antenna 6.

The implementation of the method for measuring the incidence direction of a wave according to the invention requires having two radiation patterns for each antenna.

Figure 3:
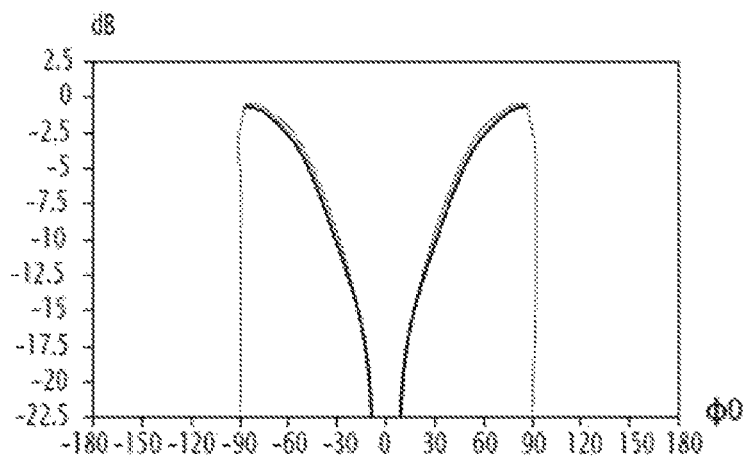
FIG. 3 is a graph in the elevation plane of the "delta" radiation pattern of an antenna obtained from signals in phase opposition on the two strands of the antenna of FIG. 2.

In a first operating mode of the antenna, the latter has a first radiation pattern, called Delta radiation pattern, denoted Δ pattern hereinafter. In the preferred embodiment described here in detail, the Δ pattern corresponds to signals in phase on the two strands of the antenna. The corresponding Δ pattern is shown in FIG. 3, along the elevation angle Φ.

Figure 4:
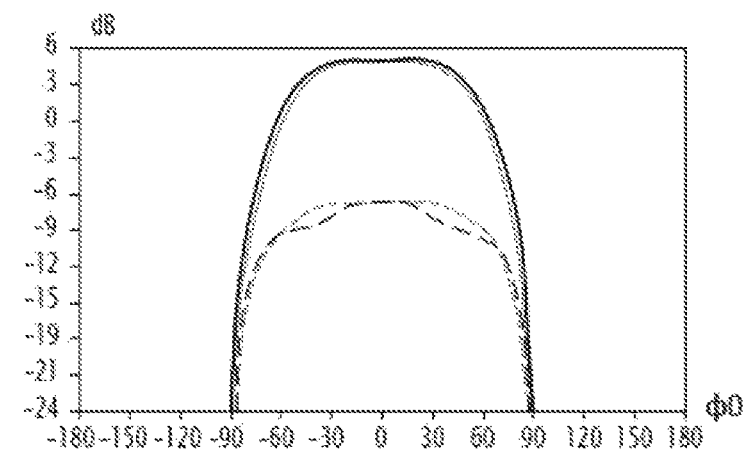
FIG. 4 is a graph in the elevation plane of the "summation" radiation pattern of an antenna obtained from signals in phase on the two strands of the antenna of FIG. 2.

In a second operating mode of the antenna, the latter has a second radiation pattern, called Sum radiation pattern, denoted Σ pattern hereinafter. In the preferred embodiment described here in detail, the Σ pattern corresponds to signals in phase opposition on the two strands of the antenna. The corresponding Σ pattern is shown in FIG. 4, along the elevation angle Φ.

These first and second patterns are symmetrical by rotation around the pointing axis of the antenna.

The Δ pattern corresponds to a gain minimum along the pointing axis Ai of the antenna i, while the Σ pattern corresponds to a gain maximum along the pointing axis Ai of the antenna i.

As shown schematically in FIG. 2, in reception, the first and second signals respectively corresponding to the first and second operating modes of the antenna i can be obtained simultaneously, by connecting the two strands of the antenna i, via two identical adapted links 12 and 13, to a first and second input of a wideband "magic tee" component 15. A first signal S1i corresponding to the difference of the signals collected on each of the strands of the antenna i will be obtained on a first output of the component 15 and a second signal S2i corresponding to the sum of the signals collected on each of the strands of the antenna will be obtained on a first output of the component 15.

Such a wideband "magic tee" component is known and is for example described in the article by J. P. Coupez et al, "Practical design of uniplanar broadband subsystems. Application to a wideband hybrid magic tee", Microwave Symposium Digest, 1994, IEEE MTT-S International, Vol. 2, p. 915-918.

Thus, the first output of the wideband "magic tee" component corresponds to the Δ operating mode of the antenna i and the first signal S1i corresponds to the Δ pattern. Thus, the second output of the wideband "magic tee" component corresponds to the Σ operating mode of the antenna i and the second signal S2i corresponds to the Σ pattern.

Downstream from the component 15, a Δ channel 16 and a Σ channel 17 allow processing of the signals delivered on the first and second outputs of the component 15, by implementing traditional processing operations: filtering, hyperfrequency amplification, quadratic detection, video filtering, etc.

Among these processing operations, a detection processing operation is in particular carried out by presence thresholding of a signal. This processing operation can be done on the Σ channel or on both the Σ and Δ channels.

Among these processing operations, a processing operation for estimating the frequency of the signal is in particular carried out. This processing operation can be done on the Σ channel or on both the Σ and Δ channels. In the case where the frequency of the incident wave is calculated on both the Σ and Δ, it will advantageously be possible to use the frequency measurement to verify that the detected signals correspond to the same transmitter.

Figure 5:
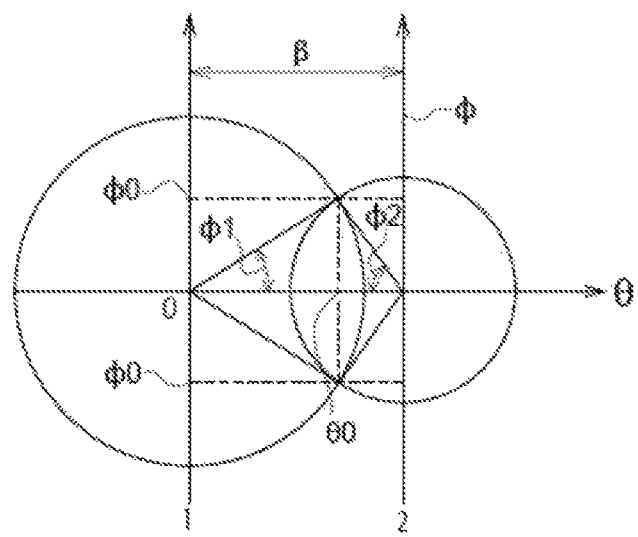
FIG. 5 is a geometric depiction of the calculation implemented in the method according to the invention.

Among these processing operations, the method for measuring the incidence direction of the incident wave is in particular carried out, which will now be described in relation to FIG. 5.

After processing, signals SΔi and SΣi are obtained.

The method for measuring the incidence direction is based on an estimate, for each antenna i, of a ratio SΔi/SΣi, i.e., the ratio of the amplitude of the signal at the output of the Δ channel 16 to the amplitude of the signal at the output of the Σ channel 17.

Indeed, in general, the ratio SΔ/SΣ is substantially proportional to the angle error measurement angle, i.e., here to the half top angle ρ of the cone of the possible arrival directions of the waves on the considered antenna.

This method is comparable to the method is implemented in monopulse radars. However, the Σ and Δ patterns here being of revolution around the pointing axis of the antenna, the comparison of the signals S on the two channels Σ and Δ does not make it possible, unlike monopulse radars, to measure the incidence direction directly, but makes it possible to measure the half top angle ρ of the cone corresponding to the possible directions of incidence.

More specifically, the half top angle ρ is calculated according to the relationship:

$$\rho = kS\Delta/S\Sigma,$$

where k is a constant that only depends on the opening of the antenna at a given frequency.

Thus, the receiver 1 includes, for each antenna i, a means 20 for determining the half-top angle ρi-k SΔi/SΣi of the possible directions of incidence.

Preferably, the determination of the ratio Δi/Σi is done by placing, in the analog or digital detection chain of the antenna, a logarithmic amplifier 22 at the output of the Δ channels, a logarithmic amplifier 23 at the output of the Σ channels, then a component 24 able to subtract the signal at the output of the Σ channel from the signal at the output of the Δ channel to obtain the logarithm of the ratio Δ/Σ according to the relationship:

$$(\text{Log}(S\Delta i/S\Sigma i) = \text{Log}(S\Delta i) - \text{Log}(S\Sigma i)).$$

A component 25 is next able to carry out an exponential function, inverse of the logarithm, so as to obtain the desired ratio SΔi/SΣi as output.

Then, a component 26 is next able to multiply the ratio $S\Delta/S\Sigma i$ by the constant k to obtain the half top angle $\rho i$.

Since the opening of a spiral antenna is, in the first order, independent of the frequency, k is also independent of the frequency. However, in light of the possible imperfections of the radiation pattern inherent to its extended-frequency operating range, it may be necessary to perform a calibration making it possible to adjust the value of k as a function of the frequency. This is shown schematically by block 27 in FIG. 2.

Likewise, the dependence between the half top angle $\rho i$ and the ratio $S\Delta/S\Sigma i$ not being strictly linear, it may be necessary, to improve the performance, to use a compensation table, obtained by calibration, and to improve the value of the half top angle determined from the relationship above.

The method continues with a step for calculating the bearing and elevation angles of the incidence direction implemented by the means 30 in the receiver 1.

This step is carried out for at least two adjacent antennas, for example the antennas 1 and 2. As indicated above, the misalignment angle β in the plane XY between two adjacent antennas is equal to 60°.

It will be noted that this value corresponds to the case of six antennas, described here in detail. In one general case, and if one wishes to cover 360° of bearing, the misalignment angle between two adjacent antennas 360°/N, where N is the total number of antennas. Alternatively, if one only wishes to cover a bearing domain D, the misalignment angle is D/N.

For the first antenna of the considered pair of antennas, the incident wave arrives with a bearing angle θ0 and an elevation angle Φ0 such that a first half top angle ρ1 is determined. For the second antenna of said considered pair of antennas, the incident wave arrives with a bearing θ0+β and an elevation Φ0, such that a second half top angle ρ2 is determined.

It is then possible to calculate the value of the angles of incidence θ0 and Φ0, which correspond to the intersection of the first and second cones. To that end and according to FIG. 5, we have the following geometric relationships:

$$\rho1^2 = \theta0^2 + \Phi0^2 \quad (1)$$

and $$\rho2^2 = (\beta - \theta0)^2 + \Phi0^2 \quad (2)$$

Which leads to:

$$\Theta0 = (\rho2^2 - \rho1^2)/2\beta - \beta/2 \quad (3)$$

$$\Phi0 = \pm[\rho1^2 - (\rho2^2 - \rho1^2)/2\beta - \beta/2]^{-1/2} \quad (4)$$

These equations lead to an ambiguity, i.e., two symmetrical solutions relative to the horizontal plane XY.

In general, the choice of the solution of interest, therefore the elimination of the ambiguous solution, results from the analysis of the situation leading to a limitation of the elevation domain. For example, in the case of use at sea, on a ship, the source of the incident wave cannot have a negative elevation.

The elevation angle Φ0 is an item of information of interest that can for example be used to best orient a scrambling or decoy countermeasure. The determination of this angle therefore makes it possible to eliminate the use of an additional device dedicated to measuring the elevation angle.

It is also possible to use a third antenna that is misaligned relative to the other two (for example, in elevation), the intersection of the three obtained cones yielding the bearing angle and the elevation angle unambiguously.

It appears that the measurement of the bearing angle is not affected by the value of the elevation angle, unlike the conventional amplitude goniometry, which neglects the elevation angle in estimating the bearing angle, leading to a bias.

This method for measuring the incidence direction makes it possible to improve the precision of the measurement done; measuring both the bearing and elevation, with an estimating precision of the bearing substantially independent of the value of the elevation, and vice versa.

Another advantage of the proposed solution is that it can easily be implemented on existing receivers, by modifying the processing chain, but not the architecture of the receivers with which it is provided. Indeed, this solution is directly compatible with the antennas already used and does not increase the number of antennas to be used.

This method in particular applies to instantaneous wideband electronic war receivers.

This method for measuring the incidence direction can be applied alone or in addition to an amplitude goniometry processing operation, to make it more robust.

In the embodiment described above in detail, the radiating elements of the pair of radiating elements considered to determine half top angle of a cone of possible incidence directions of a wave form vertically symmetrical radiation patterns by rotation around the pointing axis of the antenna. Under these conditions, the Δ pattern has a gain minimum in the pointing axis of the antenna, while the Σ pattern has a gain maximum in the pointing axis of the antenna.

However, in reality, it is possible for deviations, from manufacturing for instance, between the radiation patterns produced by the considered radiating elements to alter this symmetry and for the extrema of the Δ and Σ patterns to no longer coincide with the pointing axis of the antenna. This de facto state may be taken into account for example by performing a calibration operation making it possible to determine the geometric biases affecting the Δ and Σ patterns in order to correct the effects thereof on the measurements done.

The invention claimed is:

1. A method for measuring an incidence direction of a wave for an instantaneous wideband receiver, the method consists of:
   said instantaneous wideband receiver including an array of at least two antennas which points in different directions and respective radiation patterns of which overlap one another, wherein, each antenna including at least two radiating elements so as to be able to work in a first operating mode associated with a first radiation pattern, where the two radiating elements being in phase, and according to a second operating mode associated with a second radiation pattern, different from the first radiation pattern, where the two radiating elements being in phase opposition,
   acquiring, for each antenna, a first signal corresponding to the first operating mode of the antenna considered and a second signal corresponding to the second operating mode of the antenna considered;
   determining, for each antenna, half ton angle of a cone of possible incidence directions from the amplitude of the first signal and the amplitude of the second signal; and
   calculating a bearing angle and/or an elevation angle of the incidence direction by intersecting the cones of possible directions of incidence determined for each antenna.

2. The method according to claim 1, wherein the half top angle of the cone of possible incidence direction for an antenna is determined from the ratio of the amplitude of the first signal over the amplitude of the second signal.

3. The method according to claim 2, wherein the first and second radiation patterns formed by two radiating elements of an antenna are symmetrical by rotation around a pointing axis of the antenna.

4. The method according to claim 3, wherein the half top angle ρi of the cone of possible incidence direction for the $i^{th}$ antenna of the array is obtained according to the relationship:

$$\rho i = k S\Delta i / \Sigma i,$$

where k is a constant that only depends on the opening of the $i^{th}$ antenna at a given frequency, S∆i is the amplitude of the first signal and SΣi is the amplitude of the second signal.

5. The method according to claim 2, wherein the ratio of the amplitude of the first signal to the amplitude of the second signal is obtained after a step of logarithmic amplification of the first and second signals, a step of difference between the amplified signals, and a step of exponential amplification of the difference obtained.

6. The method according to claim 1, wherein the calculation of the bearing angle is done independently of, or simultaneously with, the calculation of the elevation angle.

7. The method according to claim 1, wherein the first radiation patterns of two successive antennas of the array overlap one another at least over half of an opening of the antennas, and the second radiation patterns of two successive antennas of the array overlap one another at least over half of an opening of the antennas.

8. The method according to claim 1, including, in parallel, an amplitude goniometry processing operation.

9. An instantaneous wideband receiver including:
an array of at least two antennas, which point in different directions and respective radiation patterns of which overlap one another, each antenna including at least two radiating elements so as to work in a first operating mode associated with a first radiation pattern, where the two radiating elements are in phase, and according to a second operating mode associated with a second radiation pattern, different from the first radiation pattern, where the two radiating elements are in phase opposition;
a means for acquiring, for each antenna, a first signal corresponding to the first operating mode of the antenna considered and a second signal corresponding to the second operating mode of the antenna considered;
a means for determining, for each antenna, a half top angle of a cone of possible incidence directions from the amplitude of the first signal and the amplitude of the second signal;
a means for calculating a bearing angle and/or an elevation angle of the incidence direction by intersecting the cones of possible directions of incidence determined for each antenna.

10. The receiver according to claim 9, wherein the first and second radiation patterns formed by the two radiating elements of an antenna are symmetrical by rotation around a pointing axis of the antenna.

11. The receiver according to claim 9, wherein each antenna of the array is a two-strand printed spiral antenna, each strand constituting one of the radiating elements of the antenna.

12. The receiver according to claim 11, wherein the means for acquiring includes a wideband "magic tee" component, a first input of which is connected to one strand of the antenna, a second input of which is connected to the other strand of the antenna, a first output of which delivers the first signal, and a second output of which delivers the second signal.

13. The receiver according to claim 9, wherein a means for determining is an analog or digital means including a logarithmic amplifier, a subtracter and an exponential amplifier for determining a ratio of the amplitude of the first signal to the amplitude of the second signal.

* * * * *